US012800403B2

(12) United States Patent
Li et al.

(10) Patent No.: US 12,800,403 B2
(45) Date of Patent: Nov. 17, 2026

(54) SENSOR HOLDER, ELECTRICAL MACHINE UNIT AND USE OF A SENSOR HOLDER

(71) Applicant: SEG Automotive Germany GmbH, Stuttgart (DE)

(72) Inventors: Wei Li, Stuttgart (DE); Micha Philipp Haussmann, Stuttgart (DE); Franziska Moebius-Schreiber, Stuttgart (DE); Rafael Scorsato, Stuttgart (DE); Michael Sparka, Stuttgart (DE)

(73) Assignee: SEG Automotive Germany GmbH, Stuttgart (DE)

( * ) Notice: Subject to any disclaimer, the term of this patent is extended or adjusted under 35 U.S.C. 154(b) by 363 days.

(21) Appl. No.: 18/409,092

(22) Filed: Jan. 10, 2024

(65) Prior Publication Data

US 2024/0230421 A1 Jul. 11, 2024

(30) Foreign Application Priority Data

Jan. 10, 2023 (DE) ......................... 102023100434.4

(51) Int. Cl.
*G01K 1/14* (2021.01)
*G01B 7/30* (2006.01)
(Continued)

(52) U.S. Cl.
CPC ................. *G01K 1/14* (2013.01); *G01B 7/30* (2013.01); *G01D 5/20* (2013.01); *G01D 11/30* (2013.01); *H02K 11/21* (2016.01); *H02K 11/225* (2016.01); *H02K 11/25* (2016.01); *G01B 21/00* (2013.01); *G01K 13/00* (2013.01); *H02K 11/33* (2016.01); *H02K 2213/03* (2013.01)

(58) Field of Classification Search
CPC . G01K 1/14; G01K 13/00; G01B 7/30; G01B 21/00; G01D 5/20; G01D 11/30; H02K 11/21; H02K 11/225; H02K 11/25; H02K 11/33; H02K 2213/03
USPC .......................................................... 374/208
See application file for complete search history.

(56) References Cited

U.S. PATENT DOCUMENTS 6,637,279 B2 * 10/2003 Kroll .................. F15B 15/2807 73/866.5
11,374,464 B2 * 6/2022 Shinkai .................... H02K 3/24
(Continued)

FOREIGN PATENT DOCUMENTS

CN 2 06 564 522 U 10/2017
DE 10 2018 128 178 A1 5/2020
(Continued)

*Primary Examiner* — Nathaniel T Woodward
*Assistant Examiner* — Philip L Cotey
(74) *Attorney, Agent, or Firm* — Cozen O'Connor

(57) ABSTRACT

The invention relates to a sensor holder (130) for use with an electrical machine unit, the electrical machine unit comprising an electrical machine having a rotor, a stator and a fan (118), and a power converter for the electrical machine, the power converter being attached to the electrical machine, wherein the sensor mount (130) comprises a first sensor housing part (132) and a second sensor housing part (136), wherein the first sensor housing part (132) is configured to receive a rotor position sensor (140), and wherein the second sensor housing part (136) is configured to receive a temperature sensor (142) for measuring a temperature of the electrical machine (110), in particular in the vicinity of the fan (118).

14 Claims, 5 Drawing Sheets

(51) Int. Cl.

| | |
|---|---|
| ***G01D 5/20*** | (2006.01) |
| ***G01D 11/30*** | (2006.01) |
| ***H02K 11/21*** | (2016.01) |
| ***H02K 11/225*** | (2016.01) |
| ***H02K 11/25*** | (2016.01) |
| *G01B 21/00* | (2006.01) |
| *G01K 13/00* | (2021.01) |
| *H02K 11/33* | (2016.01) |

(56) References Cited

U.S. PATENT DOCUMENTS

| | | | | |
|---|---|---|---|---|
| 2002/0014128 | A1* | 2/2002 | Kroll | F15B 15/2892 73/431 |
| 2007/0069667 | A1* | 3/2007 | Adra | H02P 25/18 318/135 |
| 2014/0361648 | A1* | 12/2014 | Shirakata | H02K 11/05 310/52 |
| 2017/0305676 | A1* | 10/2017 | Ramezani | B65G 13/06 |
| 2018/0017446 | A1* | 1/2018 | Yoshihara | H02K 11/25 |
| 2020/0059134 | A1* | 2/2020 | Shinkai | H02K 3/24 |
| 2021/0126512 | A1* | 4/2021 | Wiechert | H02K 11/25 |
| 2022/0006364 | A1* | 1/2022 | Ruppert | H02K 11/25 |
| 2022/0094251 | A1* | 3/2022 | Niwa | B25F 5/00 |
| 2022/0115931 | A1* | 4/2022 | Embo | H02K 11/21 |
| 2022/0320969 | A1* | 10/2022 | Yazaki | H02K 24/00 |
| 2022/0345008 | A1* | 10/2022 | Ruppert | H02K 5/22 |
| 2022/0407374 | A1* | 12/2022 | Radford | H02K 1/02 |
| 2023/0119735 | A1* | 4/2023 | Chikaraishi | H02K 11/215 310/216.001 |
| 2024/0142313 | A1* | 5/2024 | Kopp | G01K 7/02 |

FOREIGN PATENT DOCUMENTS

| | | | |
|---|---|---|---|
| DE | 10 2021 126 356 | A1 | 4/2023 |
| EP | 3 719 971 | A1 | 10/2020 |
| JP | 2010-032 291 | A | 7/2008 |
| JP | 2010-127 834 | A | 6/2010 |
| WO | WO 2021/047712 | A1 | 3/2021 |

* cited by examiner

SENSOR HOLDER, ELECTRICAL MACHINE UNIT AND USE OF A SENSOR HOLDER

CROSS-REFERENCE TO RELATED APPLICATIONS

This application claims priority to German Patent Application No. 102023100434.4 filed Jan. 10, 2023, titled "Inner cup with temperature sensor," which is hereby incorporated in its entirety.

TECHNICAL FIELD

The present invention relates to a sensor holder for use with an electrical machine unit, wherein the electrical machine unit comprises an electrical machine and a power converter for the electrical machine, such an electrical machine unit and a use of such a sensor holder.

BACKGROUND

In electrical machines, especially those used in vehicles, so-called inverters (power converters) are used to rectify the alternating current generated or to alternate the direct current applied and thus enable the electrical machine to operate.

SUMMARY

According to the invention, a sensor holder for use with an electrical machine unit, an electrical machine unit and a use of a sensor holder with the features of the independent patent claims are proposed. Advantageous embodiments are the subject of the dependent claims and the following description.

The invention deals with electrical machines and associated power converters or inverters. In the context of the invention, the combination of electrical machine and associated power converter is to be referred to as an electrical machine unit. Typically, the power converter is attached or mounted to one end of the electrical machine. The electrical machine has a rotor, a stator and a fan. In particular, the fan can be attached or mounted on the rotor or on a rotor shaft, in particular connected to it in a rotationally fixed manner. A typical position of such a fan is on the side of the power converter so that it—as well as the electrical machine itself—can be cooled efficiently.

The electrical machine unit can be part of a vehicle, in particular also used as a traction drive. Possible electrical machines include synchronous machines, synchronous reluctance machines, induction machines, permanently excited machines and others. Such an electrical machine unit can also be used as a so-called boost-recuperation machine (or generally as a starter generator), typically together with an internal combustion engine.

Two points that must or at least can be taken into account when operating such an electrical machine unit are, on the one hand, an actual rotor position angle (or the rotor position) of a rotor of the electrical machine and, on the other hand, a temperature of the electrical machine or the electrical machine unit.

The rotor position angle can be important for controlling the electrical machine, for example. A so-called rotor position sensor (or rotor angle indicator) can be used for this purpose. Such a rotor position sensor typically works inductively, i.e. a magnetic field generated by the rotor and its orientation in relation to an axis of rotation of the rotor is detected. This allows the current rotor position to be determined or measured. Typically, the rotor position sensor is arranged on the axis of rotation or at least essentially on the axis of rotation of the rotor for this purpose. For example, the rotor position sensor can be arranged at a suitable point on the power converter for this purpose.

The temperature of the electrical machine or the electrical machine unit is relevant insofar as the electrical machine or the power converter should not become too hot. A particularly suitable position at which the temperature can be measured is as close as possible to the fan, so that the temperature of an air flow between the electrical machine and the power converter can be determined, which is a good indicator of the temperature of the electrical machine or electrical machine unit.

As has now turned out, it can be complex to arrange a rotor position sensor and a temperature sensor appropriately and install them accordingly. In particular, this often requires many individual and different components.

In view of that, a sensor holder for use with an electric machine unit is proposed. The electric machine unit has an electric machine with a rotor, a stator and a fan, and a power converter for the electric machine; the power converter is attached to the electric machine. It can therefore be an electric machine unit as described above.

The sensor holder has a first sensor housing part and a second sensor housing part. The first sensor housing part is configured to accommodate a rotor position sensor, and the second sensor housing part is configured to accommodate a temperature sensor for measuring a temperature of the electrical machine, in particular in the vicinity of the fan. In particular, the sensor holder also has the rotor position sensor and/or the temperature sensor, with the rotor position sensor then being inserted into the first housing part and/or with the temperature sensor then being inserted into the second housing part.

A sensor holder for both the rotor position sensor and the temperature sensor allows both sensors to be mounted more easily and quickly and, in particular, allows fewer and less different components to be used overall, which reduces costs. In particular, the first sensor housing part and the second sensor housing part are formed in one piece with each other.

Synthetic material (or plastic) is a particularly suitable material for the sensor holder, but other materials that do not block or influence magnetic fields, or at most only insignificantly, are also suitable; this can be particularly relevant for the operation of the rotor position sensor.

When using the sensor holder with an electrical machine unit, the sensor holder can then be or be arranged in particular in or on the electrical machine unit in such a way that the rotor position sensor can be arranged or is arranged or is arranged in the first sensor housing part in such a way that the rotor position sensor lies at least substantially (e.g. as precisely as possible) on the axis of rotation of the rotor. Furthermore, this can be done in such a way that the temperature sensor can be arranged or is arranged or is arranged in the second sensor housing part in such a way that the temperature sensor is less than a predetermined distance, e.g. less than 10 mm or less than 5 mm or less than 4 mm away from the fan. The sensor holder can therefore be adapted in particular to a specific shape of an electrical machine unit in order to enable both a safe and accurate determination of the rotor position angle and a safe and accurate determination of the temperature of the electrical machine.

In an embodiment of the invention, the first sensor housing part has a cylindrical recess into which the rotor position sensor can be inserted. This allows very simple, fast and precise positioning of the rotor position sensor in such a way that it is located on the axis of rotation and also close to the rotor shaft.

In an embodiment of the invention, the second sensor housing part has an elongated, in particular cylindrical sleeve into which the temperature sensor can be inserted. In particular, the second sensor housing part can be closed at one end of the elongated or cylindrical sleeve. In this way, the temperature sensor can be easily and securely inserted into the sleeve up to the stop (or not quite up to the stop). The sleeve and its alignment allow the temperature sensor to be brought to a desired position—i.e. in particular close to the fan.

In an embodiment of the invention, an axis (or axis of rotation) of the cylindrical recess of the first sensor housing part and an axis (or axis of rotation) of the elongated or cylindrical sleeve of the second sensor housing part form a non-zero angle with one another. In particular, the axes of the cylindrical recess and the sleeve each refer to a hypothetical axis; there is no real rotation here, as with the axis of rotation of the rotor. In the case of the elongated or cylindrical sleeve, the axis therefore corresponds, for example, to the main extension direction; in the case of the cylindrical recess, the axis can, for example, be an axis of symmetry. The angle between these two axes of rotation can be between 2° and 15°, preferably between 5° and 10°. This makes it possible to guide one end of the sleeve—and thus the temperature sensor—past the rotor shaft to the fan.

An electrical connection of the wires of the temperature sensor to the power converter or a circuit board is preferably as central as possible, where the rotor position sensor is also connected. This results in a compact design or layout of the circuit board. However, the temperature sensor itself should be as close or as close as possible to the air flow of the fan; such a position is, however, outside the axis of rotation of the rotor. An angle greater than zero therefore allows the temperature sensor or the sensor element to be positioned as close or as well as possible in the fan's air flow, but with an electrical connection to the circuit board as central as possible in relation to the axis of rotation. An angle of 0°, on the other hand, would mean that the electrical connection of the temperature sensor or its wires to the circuit board would have to be made far away from the axis of rotation, which would run counter to a compact layout of the circuit board. In turn, an angle that is too large could possibly lead to problems when manufacturing the sensor holder.

In an embodiment of the invention, the sensor holder further comprises the temperature sensor, busbars and a fastening element. The busbars are arranged in or on the fastening element, with wires of the temperature sensor being electrically conductively connected to the busbars at a first end of the busbars. Typically, a temperature sensor has two wires via which a voltage can be applied to the actual sensor element. Accordingly, two busbars can be provided. In particular, the wires and the busbars can each be welded or soldered together (i.e. one wire to one busbar). The busbars protrude from the fastening element at a second end. Furthermore, the fastening element is inserted or can be inserted into the second sensor housing part in such a way that the temperature sensor is located in the second sensor housing part and that the busbars protrude from the second sensor housing part at the second end. In this way, the temperature sensor can on the one hand be securely and stably inserted into the second housing part and held therein, and on the other hand the temperature sensor can then be easily and securely electrically connected to a circuit board or other suitable location via the busbars in order to be able to control or read out the temperature sensor during operation. In particular, the busbars can be thicker and/or wider than the wires, which ensures additional stability. The wires of the temperature sensor are protected insofar as they are located in the second sensor housing part.

When assembling the electrical machine unit, especially when inserting the temperature sensor into the sensor holder, it is no longer necessary to handle long thin wires, e.g. using pliers or a robot gripper, which reduces the risk of damage. The connection via the busbars to a circuit board of the power converter is also more advantageous in that no thin wires need to be soldered to the circuit board, which would usually also involve cutting off wires that are too long.

In an embodiment of the invention, the busbars each comprise at least two bends on the sides of the second end, outside the fastening element. In this way, the busbars have resilient properties, which reduces the risk of damage in the event of vibrations of the electrical machine unit.

In an embodiment of the invention, the wires of the temperature sensor each comprise at least two bends. In this way, the wires also have resilient properties, which reduces the risk of damage in the event of vibrations of the electrical machine unit.

In an embodiment of the invention, the fastening element has one or more ribs for clamping with the second sensor housing part. In an embodiment, the fastening element may comprise two parts that are connected to each other directly or via the busbars. In this case, each of the two parts can have one or more ribs. This allows the fastening element—and therefore the temperature sensor—to be held securely and firmly in the second housing part, even with any tolerances.

In an embodiment of the invention, connection points at which the wires of the temperature sensor are electrically conductively connected to the busbars are surrounded by a part of the fastening element, in particular overmolded (e.g. by means of so-called injection molding). This ensures that the connection points are protected against corrosion and/or vibration, in particular before they are inserted into the second housing part, but also after insertion.

As mentioned, the invention also relates to an electrical machine unit with a sensor holder and to the use of a sensor holder with an electrical machine unit. With regard to the advantages and embodiments, reference is made here to the above explanations, which apply here accordingly. This applies in particular with regard to the aforementioned arrangement of the sensor holder—and thus of the rotor position sensor and temperature sensor in relation to the electrical machine or the rotor and the fan.

Further advantages and embodiments of the invention are shown in the description and the accompanying drawing.

The invention is illustrated schematically in the drawing by means of embodiments and is described below with reference to the drawing.

DETAILED DESCRIPTION

Figure 1:
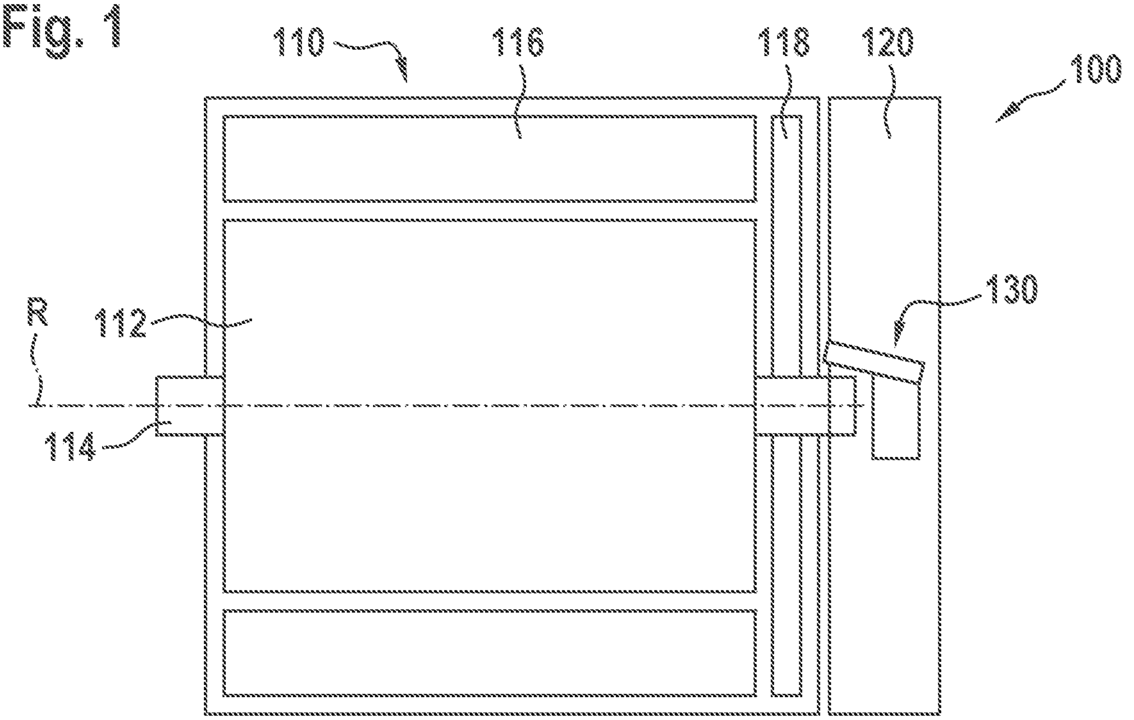
FIG. 1 schematically shows an electrical machine unit according to the invention in a preferred embodiment.

In FIG. 1, a preferred embodiment of an electrical machine unit 100 according to the invention is shown roughly schematically. The electrical machine unit 100 has an electrical machine 110 and a power converter or inverter 120. The electrical machine 110 in turn has a rotor 112, a stator 116 and a fan 118. The rotor 112 has a rotor shaft 114 with an axis of rotation R, by means of which the rotor 112 is rotatably mounted in a bearing which is not shown in detail. The fan 118 is exemplarily arranged or fastened to the rotor shaft 114 in a rotationally fixed manner.

The power converter 120 is arranged at or attached to the electrical machine 110 at an axial end of the electrical machine 110. The fan 118 is arranged on the side of the power converter 120, so that an air flow generated by means of the fan 118 can cool not only the electrical machine 110 (or the rotor 112 and the stator 116 of the electrical machine), but also the power converter or electrical components of the power converter, for example via a heat sink present in or on the power converter. A (possibly further) fan could also be arranged at the other axial end of the electrical machine.

Furthermore, the electrical machine unit 100 has a sensor holder 130. In particular, this may be a sensor holder according to the invention in a preferred embodiment. The sensor holder 130 is arranged between an axial end of the rotor shaft 114 (on the side of the fan 118) and the power converter 120 (possibly in a recess in the power converter 120). For example, the sensor holder 130 may be fixed in the power converter 120 or generally in the electrical machine unit 100 by means of suitable fixing means.

A more detailed description of the sensor holder 130 and the sensors, rotor position sensor and temperature sensor, which are or can be inserted therein, will be given below with reference to the other FIGS.

Figure 2:
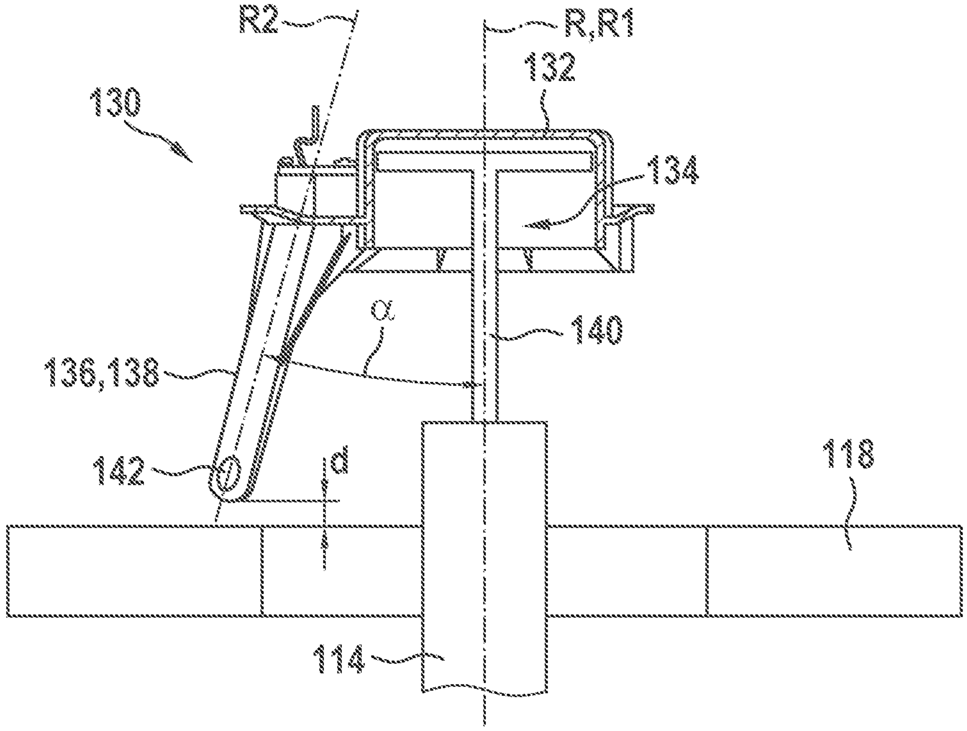
FIG. 2 schematically shows a part of the electrical machine unit from FIG. 1 in a different view.

FIG. 2 schematically shows a part of the electrical machine unit from FIG. 1 in a different view. In particular, the sensor holder 130 is shown in a more detailed view, as well as the rotor shaft 114 with the fan 118 attached to it.

The sensor holder 130 has a first sensor housing part 132 and a second sensor housing part 136, both of which are formed integrally with one another in particular. For example, the sensor holder 130 may be formed from plastic, for example, the sensor holder may be manufactured by injection molding.

The first sensor housing part 132 in turn has a cylindrical recess 134. For this purpose, the first sensor housing part 132 can be shaped accordingly, for example. The cylindrical recess 134 has an axis or axis of symmetry R1. A rotor position sensor 140 is inserted in the cylindrical recess 134 and thus in the first sensor housing part 132, and in particular is also fixed there. The sensor holder 130 and the second sensor housing part 132 are thereby arranged and aligned (e.g. in or on the power converter not shown here) such that the rotor position sensor 140 lies at least substantially on the axis of rotation R of the rotor 112. This is achieved, for example, by the axis R1 coinciding with the axis of rotation R. In this way, the rotor position sensor 140 can detect or measure the rotor position angle.

The second sensor housing part 136 has an elongate, e.g. cylindrical sleeve 138. For this purpose, the second sensor housing part 136 can be shaped accordingly, for example. The sleeve 138 has an axis or axis of symmetry or axis of extension R2. The axis R2 includes an angle $\alpha$ with the axis R1 that is greater than zero, for example 5°. The second sensor housing part 136 or the sleeve 138 has a length (along the axis R2) such that one end of the sleeve 138, which is on the side of the fan 118, is very close to the fan 118, e.g. at a distance of approximately d from the fan 118. The sleeve 138 can be closed at this end, which is on the side of the fan 118, but open at the other end. A temperature sensor 142 can thus be inserted into the sleeve 138 and thus into the second sensor housing part 136, in particular, for example, up to the stop at the closed end. The temperature sensor 142 can thus be brought very close to the fan 118, for example up to the distance d. Depending on the wind force of the sleeve at the closed end and depending on the specific mounting of the sensor holder 130 in the electrical machine unit 100, a length of the sleeve 138 along the axis R2 can be selected such that the temperature sensor 142 comes to lie at the distance d from the fan 118.

Figure 3:
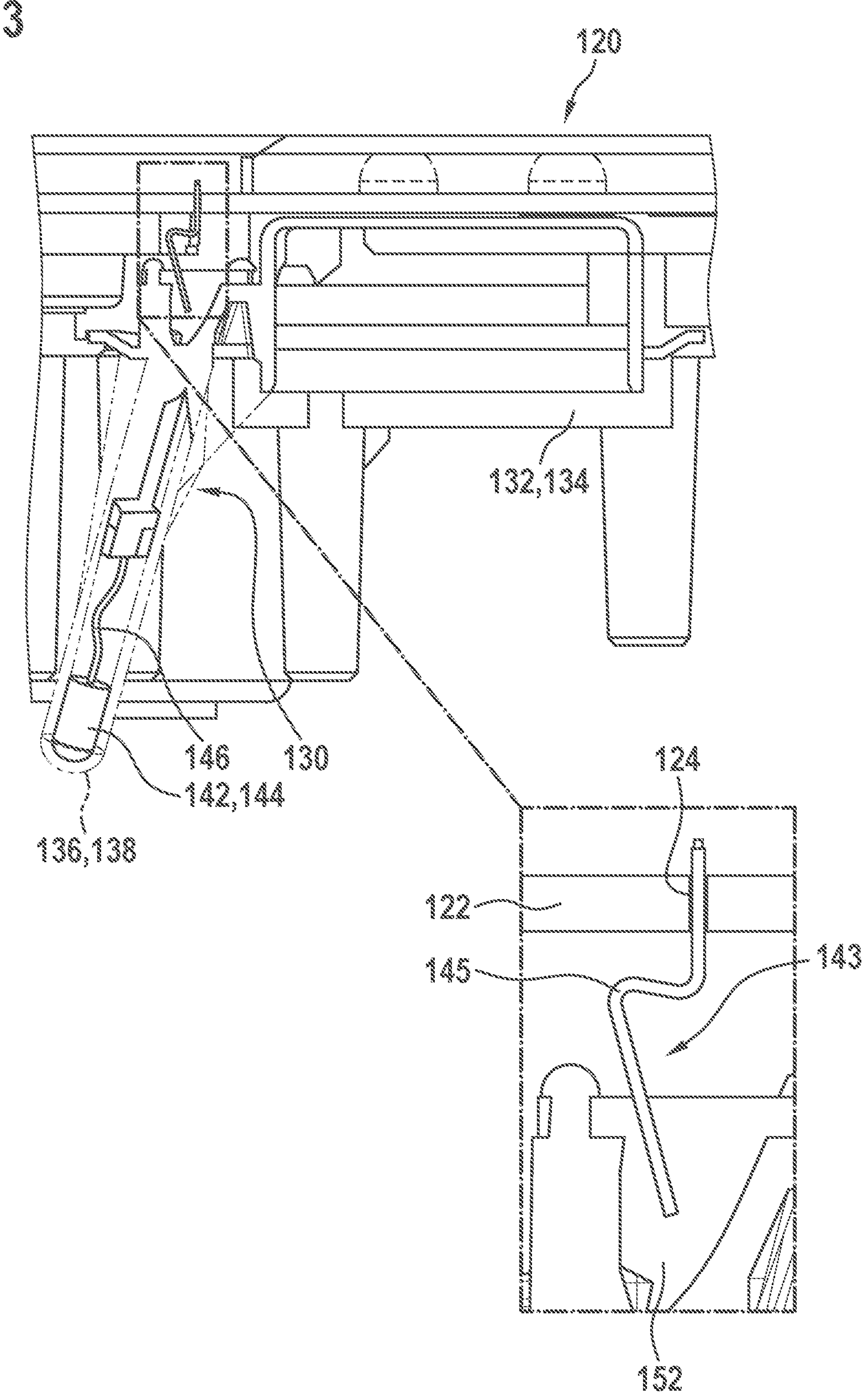
FIG. 3 schematically shows a part of the electrical machine unit from FIG. 1 in a different view.

In FIG. 3, a part of the electrical machine unit from FIG. 1 is shown schematically in a different view, namely the power converter 120 or a part thereof and the sensor holder 130. A section is also shown enlarged. The sensor holder 130 is arranged or fastened near a circuit board 122 of the power converter 120. The rotor position sensor is not shown here, but the temperature sensor 142 is shown, namely in a situation in which the temperature sensor 142 is inserted into the second sensor part 136 or the sleeve 138.

In particular, the temperature sensor 142 comprises the actual sensor or measuring element 144 and two wires 146, which are attached to the sensor or measuring element 144. In addition, a fastening element is provided, of which in particular a part 152 is shown in the enlarged section. Two busbars 143 protrude from the part 152 (due to the sectional view, only one of these can be seen), so that these in particular also protrude from the second housing part 136. The busbars 143 each comprise two bends, one of which is labeled 145, and are guided through an opening 124 in the circuit board 122. There, the busbars 143 can be electrically conductively connected, e.g. soldered, to the circuit board 122.

Figure 4:
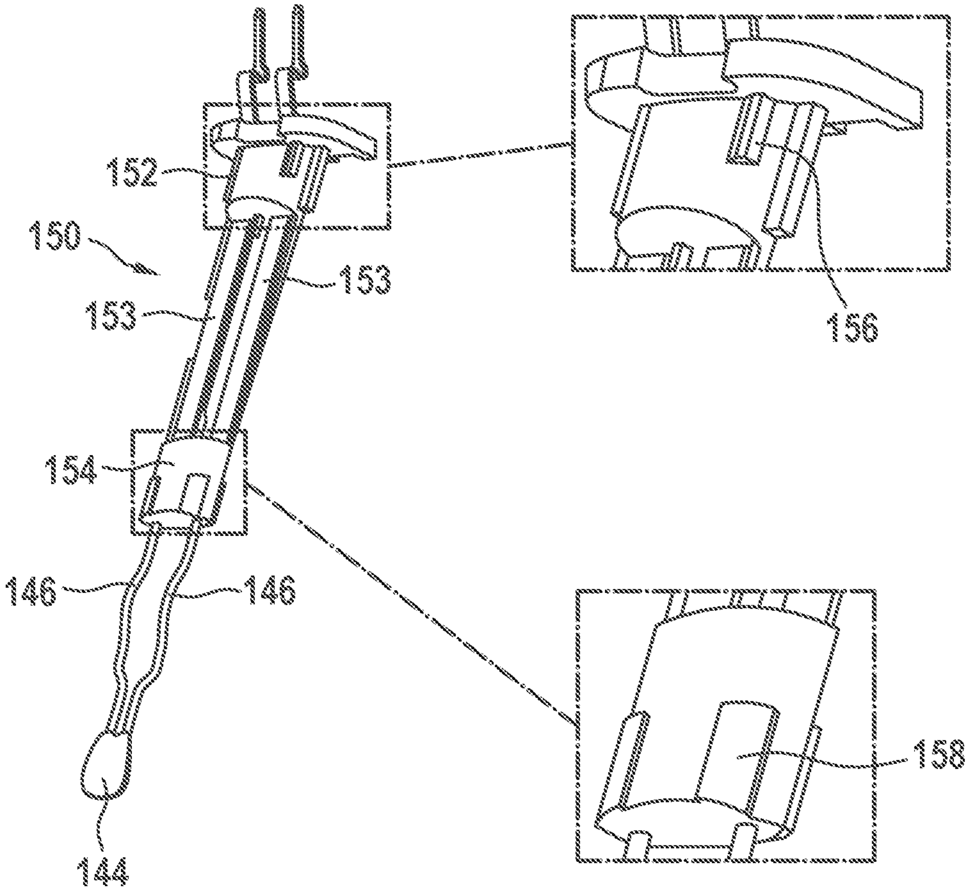
FIG. 4 schematically shows a temperature sensor and a fastening element to illustrate the invention.

FIG. 4 schematically shows the temperature sensor 142 and a fastening element 150 to explain the invention, namely in a perspective view. Of the temperature sensor 142, the sensor or measuring element 144 and the two wires 146 are again shown here. The fastening element 150 comprises two parts 152, 154, wherein the part 152 (a head part) is also shown in FIG. 3. The two parts 152 and 154 are connected to each other. The two busbars 153 extend from part 152 (head part) to part 154 (a foot part).

Figure 5:
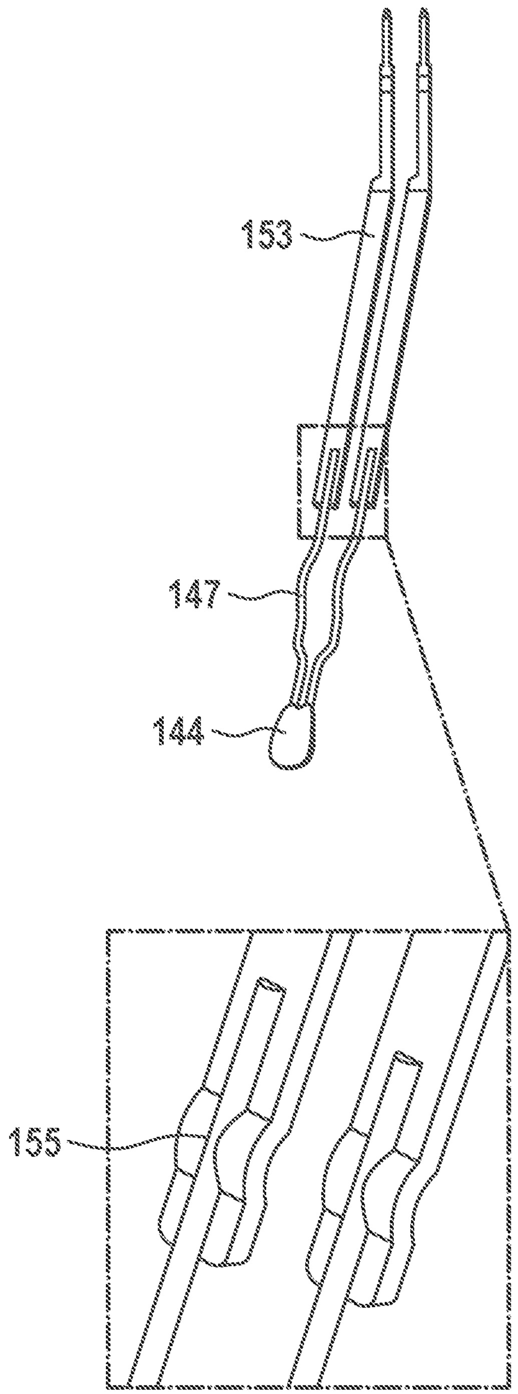
FIG. 5 schematically shows a temperature sensor to illustrate the invention.

The part 152 surrounds connection points at which the wires 146 are each electrically conductively connected to the busbar 143. This is shown in more detail in FIG. 5; the fastening element 150 is not shown here. The connection points 155 can be seen in an enlarged section. These connection points 155 can then be surrounded by the fastening element 150 or its part 154; for example, the connection points 155 can be overmolded. Two bends in each of the wires 146, one of which is labeled 147, can also be seen here as an example. The bends 147 of the wires 146 and the bends 145 of the conductor rails 143 (these are not shown in FIG. 5, but are shown in FIGS. 3 and 4) make it possible to prevent vibrations from causing damage or tearing.

FIG. 4 also shows parts 152 and 154 in greater detail in an enlarged section. Several ribs 156 on part 152 and several ribs 158 on part 154 can be seen here as examples. These ribs 156, 158 can, for example, be produced directly during the manufacture of the fastening element 150. These ribs serve to ensure that the fastening element 150 or each of the parts 152, 154 can be clamped with or in the sleeve 138 when the fastening element 150 with the temperature sensor 142 and the busbars 143 is inserted into the sleeve 138.

Figure 6:
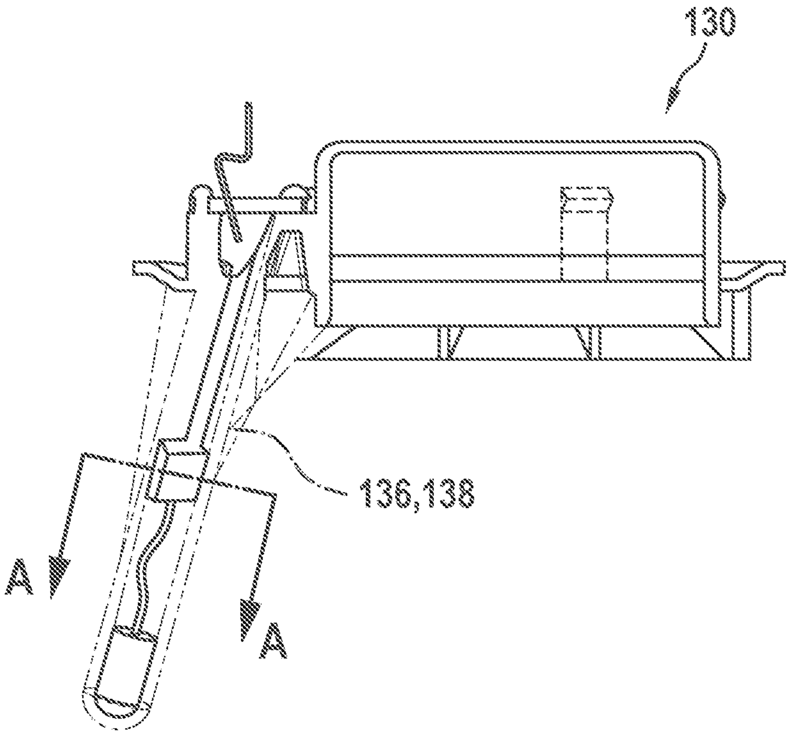
FIG. 6 schematically shows a sensor holder according to the invention in a preferred embodiment.
Figure 6:
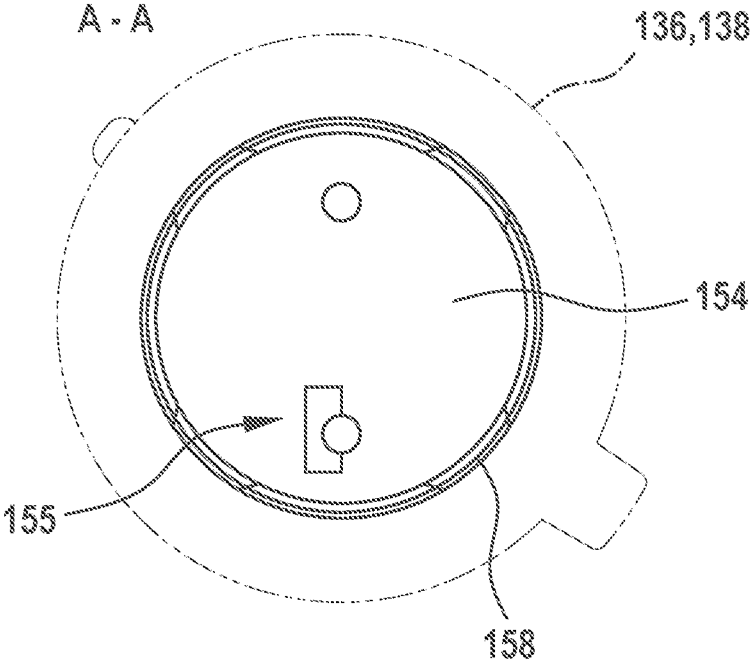

This is shown in FIG. 6, in which the sensor holder 130 is shown at the top in a side view as in FIG. 3, and at the bottom in a sectional view A-A along the sectional line A-A, as indicated in the upper representation of FIG. 6. Here the part 154 with the ribs 158 can be seen, whereby the ribs are engaged with the inner circumference of the sleeve 138 or provide the clamping. This can apply equally to the part 152 and the ribs 156. In this way, the fastening element 150—and thus the temperature sensor 142 and the busbars—are held stably and securely in the sleeve 138.

It can also be seen in FIG. 6 that the connection points 155 are surrounded by the part 154, e.g. overmolded, so that the connection points 155 are protected against corrosion and/or against vibration (or damage due to vibration), for example.

The invention claimed is:

1. A sensor holder (130) for use with an electrical machine unit (100), the electrical machine unit (100) comprising an electrical machine (110) having a rotor (112), a stator (116) and a fan (118), and a power converter (120) for the electrical machine (110), the power converter (120) being attached to the electrical machine (110), the sensor holder (130) comprising:

a first sensor housing part (132) including a cylindrical recess configured to receive a rotor position sensor (140), and a second sensor housing part (136) including an elongate sleeve configured to receive a temperature sensor (142) for measuring a temperature of the electrical machine (110).

2. The sensor holder (130) according to claim 1, wherein an axis (R1) of the cylindrical recess (134) of the first sensor housing part and an axis (R2) of the elongated sleeve (138) of the second sensor housing part form a non-zero angle (α) with each other.

3. The sensor holder (130) according to claim 1, further comprising busbars (143) and a fastening element (150), wherein the busbars (143) are arranged in or on the fastening element (150), wherein wires (146) of the temperature sensor (142) are electrically conductively connected to the busbars (143) at a first end of the busbars (143), wherein the busbars (143) protrude from the fastening element (150) at a second end, and wherein the fastening element (150) is inserted or can be inserted into the second sensor housing part (136) in such a way that the temperature sensor (140) is located in the second sensor housing part (136) and that the busbars (143) protrude from the second sensor housing part (136) at the second end.

4. The sensor holder (130) according to claim 3, wherein the busbars (143) each comprise at least two bends (145) on sides of the second end, outside the fastening element (150).

5. The sensor holder (130) according to claim 3, wherein the wires (146) of the temperature sensor (142) each comprise at least two bends (147).

6. The sensor holder (130) according to claim 3, wherein the fastening element (150) comprises one or more ribs (156, 158) for clamping with the second sensor housing part (136).

7. The sensor holder (130) according to claim 3, wherein connection points (155), at which the wires (146) of the temperature sensor (142) are electrically conductively connected to the busbars (143), are surrounded, by a part (154) of the fastening element (150).

8. The sensor holder (130) according to claim 7, wherein the connection points (155) are overmolded by the part (154) of the fastening element (150).

9. The sensor holder (130) according to claim 1, wherein the first sensor housing part (132) and the second sensor housing part (136) are integrally formed with each other.

10. An electric machine unit (100), the electric machine unit comprising an electric machine (110) having a rotor (112), a stator (116) and a fan (118), and a power converter (120) for the electric machine, wherein the power converter (120) is attached to the electric machine (110), wherein the electrical machine unit (100) further comprises:

the sensor holder (130) according to claim 1, wherein the sensor holder (130) is arranged in or on the electrical machine unit (110) such that the rotor position sensor (140) can be arranged or is arranged in the first sensor housing part (132) such that the rotor position sensor (140) lies at least substantially on an axis of rotation (R) of the rotor (112), and in that the temperature sensor (142) can be arranged or is arranged in the second sensor housing part (136) in such a way that the temperature sensor (142) is less than a predetermined distance (d) away from the fan (118).

11. The electric machine unit (100) according to claim 10, which is configured as a traction drive of a vehicle or as a boost-recuperation machine.

12. A method of using the sensor holder (130) according to claim 1 with an electrical machine unit (100), wherein the electrical machine unit comprises an electrical machine having a rotor, a stator and a fan, and a power converter for the electrical machine, wherein the power converter is attached to the electrical machine, wherein the sensor holder (130) is or is arranged in or on the electrical machine unit (100) such that the rotor position sensor (140) can be or is arranged in the first sensor housing part (132) such that the rotor position sensor lies at least substantially on an axis of rotation of the rotor, and that the temperature sensor (142) can be or is arranged in the second sensor housing part (134) such that the temperature sensor is less than a predetermined distance away from the fan.

13. The sensor holder of claim 1, wherein the temperature sensor is positioned in the vicinity of the fan (118) less than a predetermined distance of approximately d from the fan.

14. The sensor holder of claim 1, wherein the elongate sleeve is cylindrical.

* * * * *